United States Patent [19]

Rogers et al.

[11] Patent Number: 4,533,861
[45] Date of Patent: Aug. 6, 1985

[54] STEPPING MOTOR DRIVE CIRCUIT

[75] Inventors: Jerrold J. Rogers; Joseph S. Trumps, both of Beaverton, Oreg.

[73] Assignee: Tektronix, Inc., Beaverton, Oreg.

[21] Appl. No.: 541,762

[22] Filed: Oct. 13, 1983

[51] Int. Cl.³ .............................................. H02K 29/04
[52] U.S. Cl. ..................................... 318/696; 318/685
[58] Field of Search ...................... 318/696, 685, 138; 361/159, 153

[56] References Cited

U.S. PATENT DOCUMENTS 3,486,096 12/1969 Van Cleave .......................... 318/696

Primary Examiner—William M. Shoop
Assistant Examiner—Saul M. Bergmann
Attorney, Agent, or Firm—John H. Bouchard; Allston L. Jones; Robert S. Hulse

[57] ABSTRACT

The present invention relates to a drive circuit for a stepping motor. The drive circuit provides a low voltage to the coils of the stepping motor in the steady state, and a high voltage to the coils when changing state. As a result, the state changes rapidly and the stepping motor is driven efficiently. The high voltage is derived from the energy which was stored in the winding of the stepping motor before the switching occurred by transferring that energy to a capacitor which achieves a charge potential that is greater than the potential of the power supply voltage.

4 Claims, 8 Drawing Figures

STEPPING MOTOR DRIVE CIRCUIT

BACKGROUND OF THE INVENTION

The present invention relates to a circuit for efficiently driving a stepping motor.

Stepping motors are suitable for digitally controlled machines, such as X-Y plotters, or the like. When driving these machines using stepping motors, it is desirable that the rotors of these stepping motors be efficiently and correctly rotated. The coils, or windings, associated with the stepping motors present an inductive load to an applied signal. As a result, each coil may be considered a series combination of an inductor and a resistor, thus, they may have associated therewith undesirably long time constants. Moreover, counter electromotive forces may be generated in the coils during rotation of the rotor. To excite the stepping motor by applying a drive voltage to its coils that voltage must overcome the effects of the inductance and resistance associated with the coils. The inductance effect impedes the establishment of, or a change in, the current flowing in the coil. As the switching speed of the drive voltage increases, the rise time of the current to the desired operation level becomes more significant and the torque exerted on the rotor becomes weaker. Thus, it is well known that it is necessary to shorten the rise time of the current in order to maintain the coordination of the stepping motor in a high speed environment. To this end, various conventional techniques have been widely used.

One of the conventional techniques involves the insertion of a resistor in series with the coil of the stepping motor and raising the power supply voltage in order to decrease the time constant thereof. However, this technique has a disadvantage in that power is wasted as a result of the inserted resistor. Another conventional technique involves the use of two power supplies, wherein a high voltage from one power supply is applied to the coil of the stepping motor for shortening the current's rise time at a certain switching time, and a low voltage from the other power supply is applied to the coil after the current in the coil reaches a predetermined value. This conventional technique is complex and the means for accomplishing this conventional technique is expensive in construction as a result of the need for two power supply circuits and a power voltage switching circuit.

A further conventional scheme involves the use of a current regulator for controlling the flow of current through the coil. However, this further conventional scheme is also complex and expensive to accomplish.

SUMMARY OF THE INVENTION

In accordance with the illustrated embodiments of the present invention, the present invention provides a selection of stepping motor drive methods and circuits. Each of the drive coils of the motor are controlled in pairs with each coil in the pair 180° away from the other coil. The embodiments include circuits for the unipolar and bipolar excitation of the coils under the control of conventional uniformly interleaved pulses wherein the number of control pulses is equal to the number of coils with each pulse corresponding to a particular coil. Additionally, the pulses assigned to two coils which are 180° from each other are 180° out of phase with each other.

Each embodiment shows a drive circuit which applies a normal operating voltage to an energized coil when switching is not occurring, and a higher voltage during the switching transition to accelerate the establishment of (shorten the rise time of) the desired current in the newly energized coil. To provide the energy necessary for the temporary application of the higher voltage to the newly energized coil, capacitance is provided to which the residual energy in the previously energized coil is transferred adding to the quiesent charge on the capacitor to provide the necessary higher voltage.

BRIEF DESCRIPTION OF THE DRAWINGS

A full understanding of the present invention will be obtained from the detailed description given hereinbelow and the accompanying drawings, which are given by way of illustration only, and thus are not limitative of the present invention, and wherein.

DESCRIPTION OF THE PREFERRED EMBODIMENT

Figure 1A:
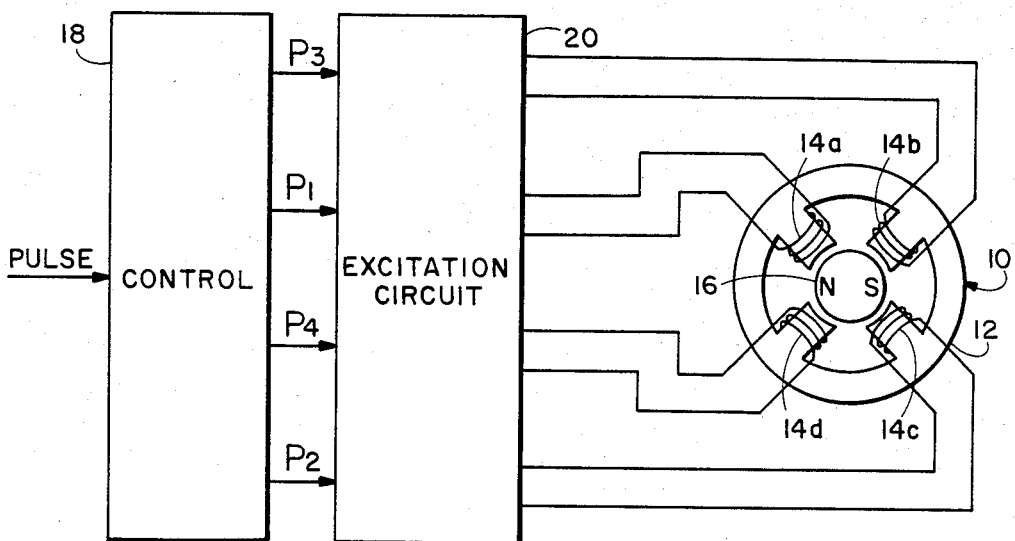
FIG. 1a illustrates a block diagram of a stepping motor and a drive circuit therefor with monofilar wound coils.
Figure 1B:
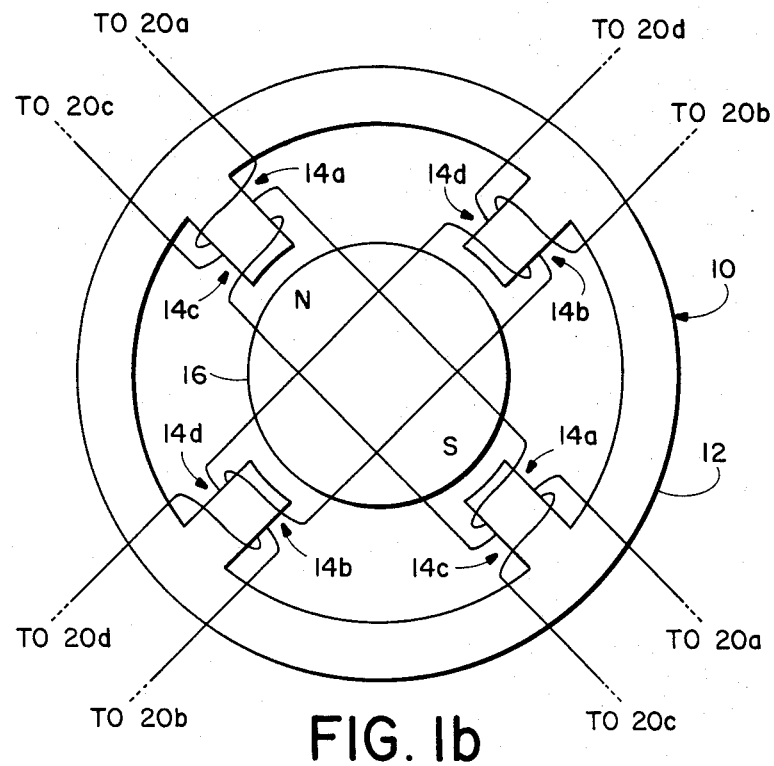
FIG. 1b shows a diagram of a stepping motor as in FIG. 1a having bifilar wound coils.
Figure 6:
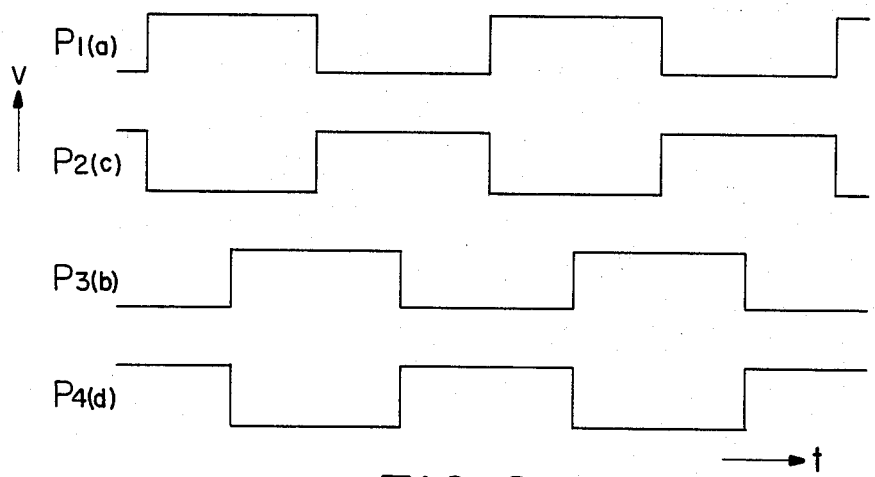
FIG. 6 illustrates the relaticnship of the control pulses P1-P4 for the embodiments illustrated in FIGS. 2-5.

Preferred embodiments of the present invention will be discussed hereinafter in conjunction with the attached drawings. FIG. 1a illustrates a block diagram of a stepping motor and a drive circuit therefor. Stepping motor 10 consists of stator 12, coils (windings) 14a–14d and rotor 16. Motor 10 may be a VR (variable reluctance) type or a PM (permanent magnetic) type stepping motor. Since the operation of the excitation circuit 20 is the same for either VR or PM stepping motors, motor 10 in this discussion, for simplicity, is of the PM type with rotor being a permanent magnet as shown. Stepping motor 10 is driven by a drive circuit including control circuit 18 and excitation circuit 20, wherein control circuit 18 acts as a distributor for generating multi-phase pulses P1 through P4 in response to an input pulse, and excitation circuit 20 applies multi-phase drive voltages to coils 14a–14d in response to the pulses from control cicuit 18. Control circuit 18 may be a conventional circuit consisting of flip-flops and gate circuits to produce pulses P1–P4 as shown in FIG. 6 at the desired frequency. Coils 14a–d are shown as being monofilar wound in FIG. 1a and as being bifilar wound in FIG. 1b.

Figure 1C:
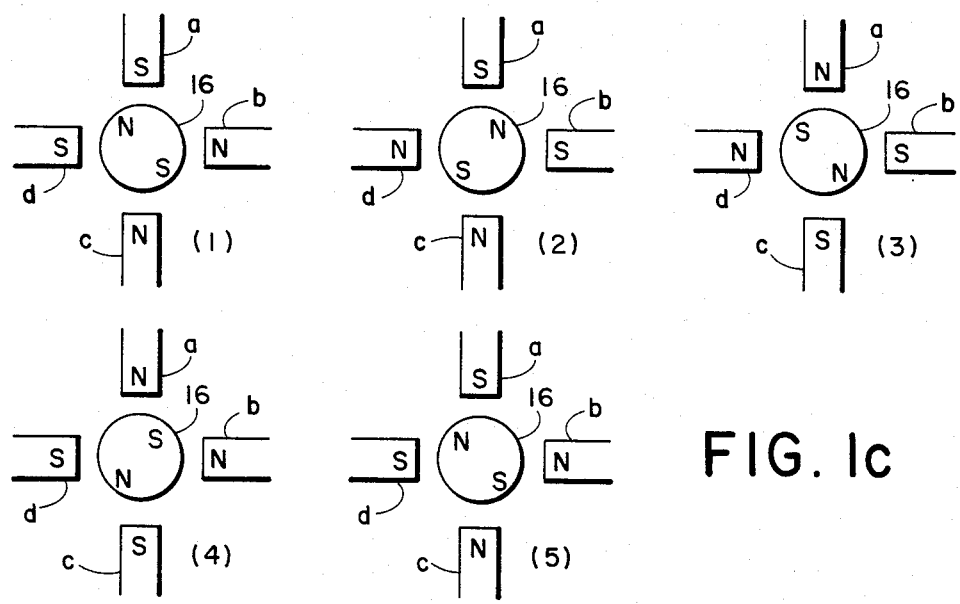
FIG. 1c shows a schematic representation of the orientation of rotor 16 for each of the possible magnetic polarities of the poles of stator 12.

The rotational operation of rotor 16 (when in the bipolar excitation mode) will be summerized hereinafter, and in each of the below described embodiments each of the poles of stator 12 will have a defined magnetic polarity. When the poles a and d, and b and c are, respectively, S and N, rotor 16 is positioned as shown in FIG. 1c(1). When the poles b and d are switched to S and N, respectively without changing the polarity of poles a and c, the N and S poles of rotor 16 face a position as shown in FIG. 1c(2). Next, by switching the polarity of poles a and c to N and S, respectively, without changing the polarity of poles b and d, the N nd S poles of rotor 16 face a position as shown in FIG. 1c(3). When the polarity of poles b and d are switched to N and S, respectively, without switching poles a and c, the N and S poles of rotor 16 face a position as shown in FIG. 1c(4). Finally, when poles a and c are again switched, without switching poles b and d, rotor 16 returns to the position shown in FIG. 1c(1). Similarly, if the order is reversed rotor 16 rotates counterclockwise. It should be noted that the switching time of coil 14a is synchronized with that of coil 14c, and the switching time of coil 14b is synchronized with that of coil 14d for both the monofilar and bifilar wound motors. As described hereinbefore, coils 14a–14d are excited by excitation circuit 20 in response to the pulses from control circuit 18. The rotation direction of rotor 16 can be changed by adjusting the phase relation among the pulses P1–P4 from control circuit 18.

In each of the illustrated embodiments of the present invention discussed below, the motor is excited in a two phase excitation mode. Additionally, for those applications for a monofilar wound motor, the winding, on the stator poles which are physically 180° apart from each other are excited so that complementary magnetic fields are generated at each pole. Further, in the bifilar wound motor applications, the two windings shared by both of the above-specified pairings of stator poles (e.g. 14a and 14c of FIG. 1b) may be excited independently. By energizing one of the bifilar windings, the field developed creates a complementary polarity orientation of the poles, and by energizing the other of the bifilar windings the field developed creates the reverse complementary polarity orientation of the poles.

Figure 2:
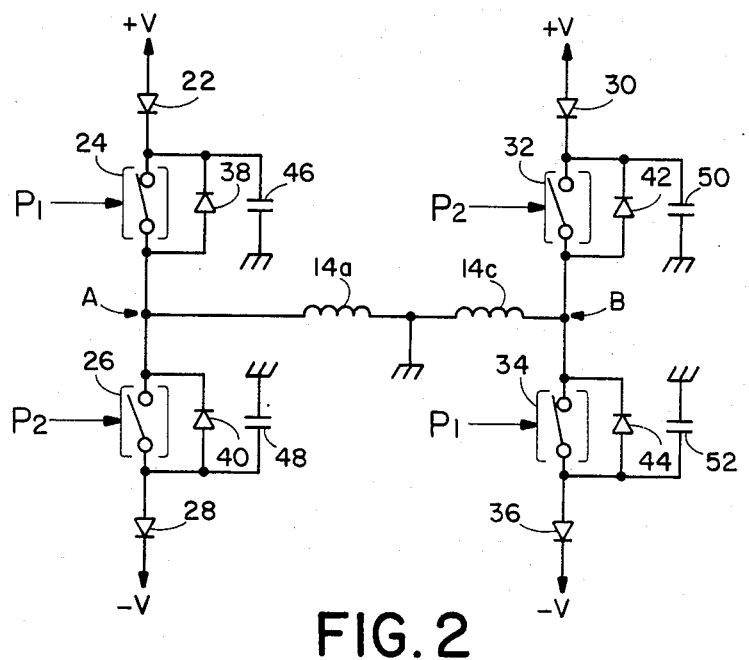
FIG. 2 illustrates a circuit diagram of a first embodiment of a stepping motor drive circuit according to the present invention.

FIG. 2 illustrates one-half of excitation circuit 20 according to a first embodiment of the present invention. This embodiment can be used for either monofilar or bifilar wound stepping motors. Diode 22, switching devices 24–26 and diode 28 are connected in series between potential sources, namely, DC voltage sources +V and −V. Similarly, diode 30, switching devices 32–34 and diode 36 are connected in series between the voltage sources +V and −V. Switching devices 24, 26, 32, and 34 can be implemented by any type of fast acting mechanical or electronic switches, such as relays or switching bipolar transistors. Switching devices 24 and 34 are controlled by the pulse P1 and switching devices 26 and 32 are controlled by the pulse P2 (see FIG. 6). Diodes 38, 40, 42 and 44 are respectively connected in parallel with switching devices 24, 26, 32 and 34, and these diodes act to allow conduction in the reverse direction when switching devices are unidirectional. Coil 14a of stepping motor 10 is connected between the common junction of switching devices 24 and 26 and another potential source, namely, ground. Similarly, coil 14c of stepping motor 10 is connected between ground and the common junction of switching devices 32 and 34. Capacitors 46, 48, 50 and 52 are connected between ground and the common junctions of diodes 22-38, 28-40, 30-42 and 36-44, respectively. It should be noted that a similar circuit is provided in exitation circuit 20 for coils 14b and 14d of stepping motor 10 under the control of pulses P3 and P4.

The current flows from the voltage source +V through diode 22-switching device 24-coil 14a to ground, and from ground through coil 14c switching device 34 - diode 36 to the voltage source −V for a first state, when switching devices 24 and 34 are closed (on) and the other switches 26 and 32 are opened (off) in accordance with the pulses P1 and P2. A second state is achieved by opening switching devices 24 and 34 and closing switching devices 26 and 32 creating a current flow path from the voltage source +V through diode 30 - switching device 32 - coil 14c to ground, and from ground through coil 14a - switching device 26 - diode 28 to the voltage source −V. When switching from the first state to the second state (or from the second state to the first state), the flow direction of the current through coils 14a and 14c cannot be changed rapidly because of the inductive characteristic of coils 14a and 14c. During a short period after the switching, the current flows from ground through capacitor 48 - diode 40 - coil 14a to ground, and from ground through coil 14c - diode 42 - capacitor 50 to ground. Thus, the energy in coils 14a and 14c is transferred to capacitors 48 and 50 which are respectively charged to negative and positive high voltages (the magnitude of that voltage dependent upon the capacitances thereof). In other words, the voltages at points A and B, respectively, swing negative and positive. It should be noted that capacitors 48 and 50 are previously charged to the voltages −V and +V, respectively, before the switching, and they are further charged by the current through coils 14a and 14c immediately after the switching. Moreover, it should be noted that diodes 28 and 30 effectively disconnect the voltage sources −V and +V, respectively, when the magnitude of the voltage stored on capacitors 48 and 50 exceeds the magnitude of the voltage of their respective voltage source. The high voltages developed on capacitors 48 and 50 accelerates the reversal of the current flow and the establishment of the new current level in coils 14a and 14c when the state change occurs. This is true since the rate of change of current through an inductor is proportional to the voltage across the inductor. The switching is complete when the magnitude of the voltage across capacitors 48 and 50 returns to the voltages −V and +V, and the voltage sources −V and +V provide the "steady-state" current to coils 14a and 14c. At this time, diodes 40 and 42 become back-biased.

A similar action takes place when switching from the second state back to the first state, wherein diodes 22 and 36 correspond to diodes 28 and 30, diodes 38 and 44 correspond to diodes 40 and 42, and capacitors 46 and 52 correspond to capacitors 48 and 50. Diodes 38, 40, 42 and 44 are necessary to act as bypasses for unilateral switching devices 24, 26, 32 and 34 (such as bipolar transistors). If the switching devices are bidirectional, such as CMOS devices, the bypass diodes are not needed.

Figure 3:
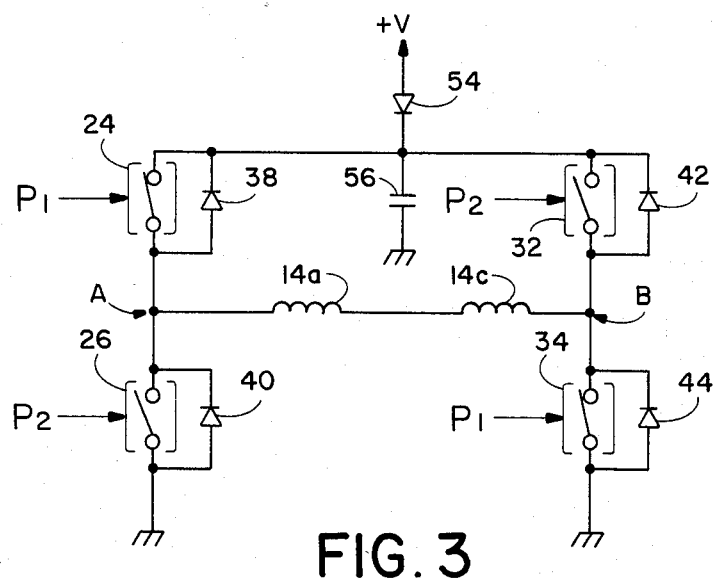
FIG. 3 illustrates a circuit diagram of a second embodiment of the stepping motor drive circuit according to the present invention.

FIG. 3 illustrates one-half of the excitation circuit 20 according to a second embodiment of the present invention. This embodiment can also be used for either monofilar or bifilar wound stepping motors. The circuit of this embodiment is similar to that of FIG. 2 with diode 54 replacing diodes 22 and 30, diodes 28 and 36 being eliminated, switching devices 26 and 34 being connected to ground instead of the −V voltage source, capacitors 46–52 being eliminated, a single capacitor 56 being connected between the cathode of diode 54 and ground, and the elimination of the ground connection at the junction of coils 14a and 14c.

When switching devices 24 and 34 are closed in response to the pulse P1 and switching devices 26 and 32 are opened in response to the pulse P2, a current flows from the voltage source +V through diode 54 switching device 24 - coils 14a and 14c - switching device 34 to ground for a first state. A second state is achieved by opening switching devices 24 and 34 and closing switching devices 26 and 32 in response to the pulses P1 and P2 to establish the current flow from the voltage source +V through diode 54 - switching device 32 - coil 14c and coil 14a - switching device 26 to ground. When switching from the first state to the second state, the inductive characteristic of coils 14a and 14c causes the voltage at a point A to swing negative and the voltage at a point B to swing positive in an attempt to maintain the current flow through coils 14a and 14c from point A to point B. This current flows from ground through diode 40 - coil 14a and coil 14c - diode 42 - capacitor 56 to ground. It should be noted that capacitor 56, previous to the state change, was charged to +V via diode 54. Thus, capacitor 56 charges to a higher voltage (the magnitude of that voltage dependent upon the capacitance thereof) than the voltage +V, and series diode 54 disconnects the voltage source +V as a current source from the balance of the circuit. The high voltage developed on capacitor 56 accelerates the reversal of the current flow from the direction defined as being from the point A to the point B to the opposite direction. Once the switching is complete, and the capacitor voltage has dropped to the level of the +V supply, the voltage supply +V once again provides the current which flows through diode 54 - switching devices 32 - coil 14c and coil 14a - switching device 26 to ground. A similar action occurs when switching from the second state back to the first state. Further, diodes 38 through 44 may be deleted if switching devices 24, 26, 32 and 34 are bidirectional. It should be noted here as well that a similar circuit is provided in excitation circuit 20 for coils 14b and 14d of stepping motor 10 under the control of pulses P3 and P4.

Figure 4:
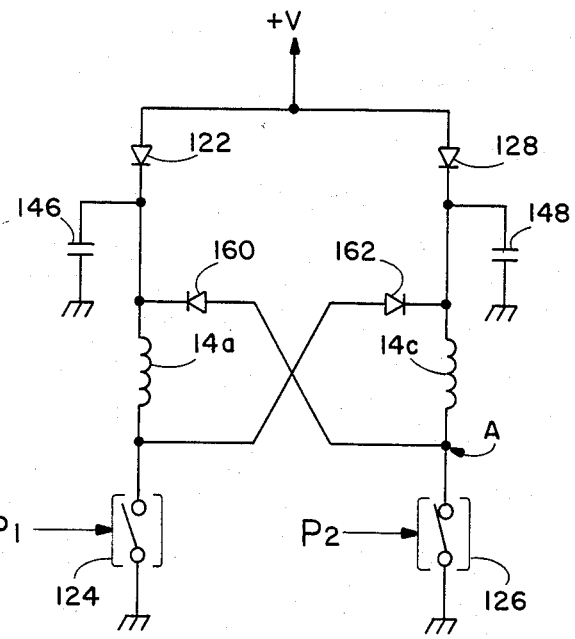
FIG. 4 illustrates a crcuit diagram of a third embodiment of the drive circuit of the present invention.

FIG. 4 illustrates excitation circuit 20 according to a third embodiment of the present invention and this embodiment can only be used for the bifilar wound stepping motor. Diode 122, coil 14a of stepping motor 10 and switching device 124 are connected in series between the voltage source +V and ground, and diode 128, coil 14c and switching device 126 are connected in series and between the voltage source +V and ground. One of the electrodes associated with each of capacitors 146 and 148 is respectively connected to the cathode of diodes 122 and 128, the other electrode thereof of each capacitor being connected to ground. In addition, diodes 160 and 162 are connected as shown in FIG. 4. Switching devices 124 and 126 are respectively controlled by the pulses P1 and P2 from control circuit 18 (see FIG. 6).

When switching devices 124 and 126 are respectively opened and closed for a first state, a current flows from the voltage source +V through diode 128 - coil 14c - switching device 126 to ground. A second state is achieved by closing and opening switching devices 124 and 126, respectively, to establish a current flow from the voltage source +V through diode 122 - coil 14a - switching device 124 to ground. When switching from the first state to the second state, the voltage at Point A rises and the current flows from ground through capacitor 148 and from the +V supply through diode 128 - coil 14c - diode 160 - capacitor 146 to ground resulting in the charging of capacitor 146. It should be noted that capacitor 146 was previously charged to the voltage +V via diode 122. Thus, the voltage developed on capacitor 146 becomes higher than the voltage +V, and diode 122 disconnects the current flow from the +V voltage supply. This high voltage on capacitor 146, due to the switching action, causes a faster establishment of the current in coil 14a. After the switching is complete, the lower voltage of +V is applied to coil 14a from voltage source +V. A similar action applies when switching from the second state to the first state. A similar circuit is provided in excitation circuit 20 for coils 14b and d under the control of pulses P3 and P4.

Figure 5:
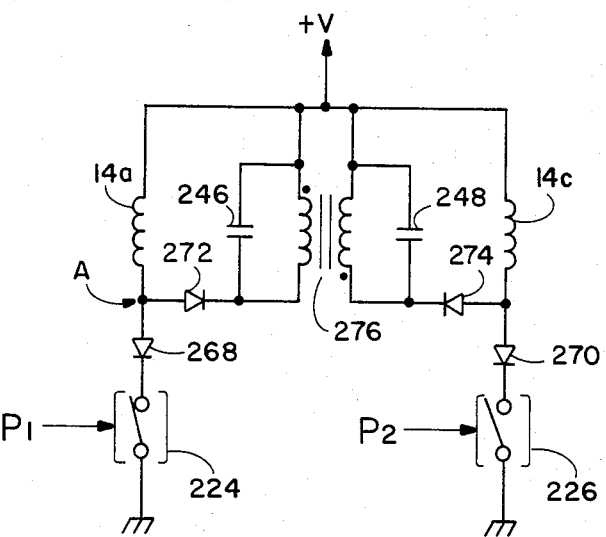
FIG. 5 illustrates a circuit diagram of a fourth embodiment of the drive circuit according to the present invention.

FIG. 5 illustrates one-half of the excitation circuit 20 according to a fourth embodiment of the present invention and also can only be used for the bifilar wound stepping motor. A series circuit consisting of coil 14a of stepping motor 10, diode 268 and switching device 224 is connected between the voltage source +V and ground. Similarly, a series circuit consisting of coil 14c, diode 270 and switching device 226 is connected between the voltage source +V and ground. A series circuit consisting of capacitor 246 and diode 272 is connected in parallel with coil 14a, and a series circuit consisting of capacitor 248 and diode 274 is connected in parallel with coil 14c. One of the windings of transformer 276 is connected in parallel with capacitor 246, and the other winding thereof is connected in parallel with capacitor 248. Switching devices 224 and 226 are controlled by the pulses P1 and P2 from control circuit 18 (see FIG. 6).

For a first state, switching device 224 is closed to establish a current path from the voltage source +V through coil 14a - diode 268 - switching device 224 to ground, with switching device 226 open. For a second state, switching device 224 is opened and switching device 226 is closed to establish a current path from the voltage source +V through coil 14c - diode 270 - switching device 226 to ground. When switching from the first state to the second state, the energy in coil 14a causes the voltage at point A to swing positive and charges capacitor 246 to a high voltage (the magnitude dependent upon the capacitance thereof). Transformer 276 is an inverting transformer which couples the charges on capacitor 246 to capacitor 248 in the reverse polarity. Capacitor 248 thus charges to a large negative voltage at the same time. The high positive and negative voltages developed on capacitors 246 and 248 quickly depletes the energy fron coil 14a and causes the current to begin flowing in coil 14c. Once switching is complete, the magnitude of the voltages stored by capacitors 246 and 248 and the voltage supply +V provides the current through coil 14c. The circuit performs similarly when switching from the second state back to the first state. Except when the circuit is switching between the first and second states, diodes 272 and 274 isolate transformer 276. Diodes 268 and 270 isolate switching devices 224 and 226, respectively, when transformer 276 produces a large negative voltage switching transient. A similar circuit is provided in excitation circuit 20 for coils 14b and d under the control of pulses P3 and P4. Additionally, it should be noted that since each of the excitation coils has one end connected to a common node, namely the +V node, this embodiment may be used with a bifilar wound stepping motor wherein one end of each of the excitation coils are interconnected, one to the other.

As understood from the foregoing description, the present invention provides a low voltage to the coils of the stepping motor when not changing state, and a high voltage during the transition, so that the state changes rapidly and the stepping motor is driven efficiently. The high voltage is derived from the energy that is stored in the windings of the stepping motor before the switching occurs, thus, there is no burden on additional power supplies, no high power consumming resistors, and no complex circuitry.

Although the above description was made only on preferred embodiments of the present invention, it will be apparent for those skilled in the art that various modifications can be made without departing from the scope and spirit of the present invention. For example, the present invention can be applied to the VR type stepping motor or the like. The windings of the stepping motor may be monofilar windings or bifilar windings. Additionally, the switching devices may be semiconductor devices or mechanical devices, and there may be any even number of evenly spaced drive coils on the stepping motor. Further, the circuits and methods of control described herein can support a stepping motor with any even number of pulses by increasing the number of uniformly interleaved pulses generated by control 18, or by interconnecting groupings of pole windings in parallel or series and controlling them with a common pulse from control 18. These methods are well known in the prior art.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

We claim:

1. A stepping motor drive circuit for a stepping motor having an even number of uniformly space drive coils to cause rotation of the rotor of the motor, the energization of said coils being controlled by a plurality of uniformly interleaved pulses wherein the number of drive coils is an integer number multiple of the number of pulses and each Pulse corresponds to a particular grouping of coils, the coils that are 180° apart from each other are paired for energization, the circuit disposed to be coupled to a first, a second and a third voltage potential source, said first voltage potential being greater than said second voltage Potential, and said third voltage potential being between and equidistant said first and second voltage potentials, said circuit for energizing each pair of coils comprising:
   first terminal (anodes of 22 and 30) for coupling to the source of said first voltage potential (+V);
   second terminal means (cathodes of 28 and 36) for coupling to the source of said second voltage potential (−V);
   third terminal means for coupling with the coil pair, with a first node disposed for coupling one end of each coil to the third voltage potential, and a second (A) and a third (B) node each for connecting with one of the other ends of each coil of the coil pair;
   fourth terminal means for coupling to the source of said third voltage potential (and);
   a first and a second diode (22, 30), each having an anode and a cathode, with the anode of each connected to the first terminal means:
   a third and a fourth diode (28, 36), each having an anode and a cathode, with the cathode of each connected to the second terminal means;
   first switching means (24) for controlling the current flow from the cathode of the first diode (22) to the second node (A) in response to the one of said uniformly interleaved control pulses corresponding to the coil to be coupled to the second node wherein the two control pulses are 180° out of phase with each other;
   second switching means (32) for controlling the current flow from the cathode of said second diode (30) to the third node (B) under the control of the other of said uniformly interleaved control pulse corrresonding to the coil to be coupled to the third node (B);
   third switchng means (26) for controlling the current flow from the second node (A) to the anode of the third diode (28) under the control of the other of said uniformly interleaved control pulses;
   fourth switching means (34) for controlling the current flow from the third node (B) to the anode of the fourth diode (36) under the control of said one of the uniformly interleaved control pulses;
   a first and a second capacitor (46, 50) each connected between the fourth terminal means and the cathode of said first and second diodes (22, 30), respectively;
   a third and a fourth capacitor (48, 52) each connected between the fourth terminal means and the anode of said third and fourth diodes (28, 36), respectively;
   a fifth diode (38), having an anode and a cathode, connected across the first switching means (24) with its cathode connected to the cathode of the first diode (22);
   a sixth diode (42), having an anode and a cathode, connected across the second switching means (32) with its cathode connected to the cathode of the second diode (30);
   a seventh diode (40), having an anode and a cathode, connected across the third switching means (26) having its anode connected to the anode of the third diode (28); and
   an eighth diode (44), having an anode and a cathode, connected across the fourth switching means (34) with its anode connected to the anode of the fourth diode (36).

2. A stepping motor drive circuit for a stepping motor having an even number of uniformly spaced drive coils to cause rotation of the rotor of the motor, the energization of said coils being controlled by a plurality of uniformly interleaved pulses wherein the number of drive coils is an integer number multiple of the number of pulses and each pulse corresponds to a particular grouping of coils, the coils that are 180° apart from each other are paired for energization, the circuit disposed to be coupled to a first and a second voltage potential source, said first voltage potential being greater than said second voltage potential, said circuit for energizing each pair of coils comprising:
   first terminal means (anode of 54) for coupling to the source of said first potential (+V);
   second terminal means (anodes of 40, 44) for coupling to the source of said second potential (gnd);

third terminal means for coupling with the coil pair, with a first node disposed for coupling together one end of each coil, and a second (A) and a third (B) node each for connecting with one of the other ends of each coil of the coil pair;

a first diode (54), having an anode and a cathode, with the anode connected to the first terminal means;

first switching means (24) for controlling the current flow from the cathode of the first diode (54) to the second node (A) in response to the one of said uniformly interleaved control pulses corresponding to the coil to be coupled to the second node (A) wherein the two control pulses are 180° out of phase with each other;

second switching means (32) for controlling the current flow from the cathode of said first diode (54) to the third node (B) under the control of the other of said uniformly interleaved control pulse corresponding to the coil to be coupled to the third node (B);

third switching means (26) for controlling the current flow from the second node (A) to the second terminal means under the control of the other of said uniformly interleaved control pulses;

fourth switching means (34) for controlling the current flow from the third node (B) to the second terminal means under the control of said one of the uniformly interleaved control pulses;

a capacitor (56) connected between the cathode of the first diode (54) and the second terminal means;

a second diode (38), having an anode and a cathode, connected across the first switching means (24) with its cathode connected to the cathode of the first diode (54);

a third diode (42), having an anode and a cathode, connected across the second switching means (32) with its cathode connected to the cathode of the first diode (54);

a fourth diode (40), having an anode and a cathode, connected across the third switching means (26) having its anode connected to the second terminal means; and a fifth diode (44), having an anode and a cathode, connected across the fourth switching means (34) with its anode connected to the second terminal means.

3. A stepping motor drive circuit for a stepping motor having an even number of uniformly spaced drive coils to cause rotation of the rotor of the motor, the energization of said coils being controlled by a plurality of uniformly interleaved pulses wherein the number of drive coils is an integer number multiple of the number of pulses and each pulse corresponds to a particular grouping of coils, the coils that are 180° apart from each other are paired for energization, the circuit disposed to be coupled to a first and a second voltage potential source, said first voltage potential being greater than said second voltage potential, said circuit for energizing each pair of coils comprising:

first terminal means for coupling to the source of said first potential (+v);

second terminal means for coupling to the source of said second potential (gnd);

third terminal means (junctions of 122-160 and 124-162) for coupling with one coil of the coil pair;

fourth terminal means (junctions of 128-162 and 126-160) for coupling with the other coil of the coil pair;

first and second diodes (122, 128), each having an anode and a cathode, with the anode of each connected to the first terminal means, and the anode of each connected to the third and fourth terminal means, respectively, for couupling to one end of each of the coils;

first and second switching means (124, 126), one each for controlling the current flow from the third and fourth terminal means coupled to the other end of each coil in the pair and the second terminal means, each of said first and second switching means (124, 126) disposed to receive, and be operable in response to, the uniformly interleaved control pulse corresponding to the coil to which the one of the first and second diodes (122, 128) is associated wherein the two control pulses are 180° out of phase with each other;

first and second capacitors (146, 148) each having one lead connected to said second terminal means and each having the other lead connected to the cathode of the first and second diodes (122, 128), respectively; and a third and a fourth diode (160, 162), each having an anode and a cathode, the anode of one of the third and fourth diodes (160, 162) being connected to the third terminal means and the other to the fourth terminal means for coupling to said one end of each coil, and the cathode of one of the third and fourth diodes (160, 162) being connected to the fourth terminal means and the other to the third terminal means for coupling to the other end of each coil, respectively.

4. A stepping motor drive circuit for a stepping motor having an even number of uniformly spaced drive coils to cause rotation of the rotor of the motor, the energization of said coils being controlled by a plurality of uniformly interleaved pulses wherein the number of drive coils is an integer number multiple of the number of pulses and each pulse corresponds to a particular grouping of coils, the coils that are 180° apart from each other are paired for energization, the circuit disposed to be coupled to a first and a second voltage potential source, said first voltage potential being greater than said second voltage potential, said circuit for energizing each pair of coils comprising:

first terminal means for coupling to the source of said first potential (+v);

second terminal means for coupling to the source of said second potential (gnd);

third terminal means (junctions of 268-272 and 270-274) for coupling with the coil pair, with one terminal disposed for coupling with one end of each coil and being coupled to the first terminal means;

first and second diodes (268, 270), each having an anode and a cathode, with the anode of each connected to the third terminal means for coupling each to the free ends of one of the coils of the coil pair;

first and second switching means (224, 226) coupled serially between the cathode of said first and second diodes (268, 270), respectively, and the second terminal means, each of said first and second switching means (268, 270), disposed to receive, and be operable in response to, the uniformly interleaved control pulse corresponding to the coil to which the one of the first and second diodes (268, 270) is associated wherein the two control pulses are 180° out of phase with each other;

a two winding inverting transformer (276) with one end of each of the windings connected to the first terminal means;

a first and second capacitor (246, 248), one of said capacitors being connected across each of the windings of the transformer (276); and a third and a fourth diode (272, 274), each having an anode and a cathode, the anode of one of the third and fourth diodes (272, 274) being connected to the anode of each of the first and second diodes (268, 270), and the cathode of one of the third and fourth diodes (272, 274) being connected to other end of each of the windings of the transformer (276).

* * * * *